United States Patent [19]

Sugiyama

[11] Patent Number: 5,111,707
[45] Date of Patent: May 12, 1992

[54] ENGINE STARTER APPARATUS

[75] Inventor: Takeshi Sugiyama, Hyogo, Japan

[73] Assignee: Mitsubishi Denki K.K., Tokyo, Japan

[21] Appl. No.: 677,041

[22] Filed: Mar. 29, 1991

[30] Foreign Application Priority Data

Apr. 11, 1990 [JP] Japan .................. 2-96719

[51] Int. Cl.⁵ .................. F02N 15/00; F16H 55/17
[52] U.S. Cl. .................. 74/7 E; 74/393; 74/437
[58] Field of Search .................. 74/6, 7 E, 393, 437

[56] References Cited

U.S. PATENT DOCUMENTS

| | | | |
|---|---|---|---|
| 2,477,441 | 7/1949 | Cole | 74/437 X |
| 3,420,116 | 1/1969 | Seybold | 74/437 X |
| 3,823,617 | 7/1974 | Infanger et al. | 74/437 X |
| 4,685,348 | 8/1987 | Takami | 74/437 |
| 4,756,203 | 7/1988 | Matsuda | 74/437 X |
| 4,901,690 | 2/1990 | Cummins et al. | 123/179 B |
| 4,912,993 | 4/1990 | Konishi et al. | 74/7 A X |

OTHER PUBLICATIONS

Bloomfield, B. "When you need Noncircular Gears", Product Engineering, Mar. 14, 1960, pp. 59-64.

Primary Examiner—Allan D. Herrmann
Assistant Examiner—David W. Laub
Attorney, Agent, or Firm—Sughrue, Mion, Zinn, Macpeak & Seas

[57] ABSTRACT

An engine starter apparatus comprising first and second noncircular gears, a pinion, and a starter motor. The pair of noncircular gears is interposed between a crankshaft and a ring gear of an engine, and when the speed of rotation of the first noncircular gear is kept constant, the second noncircular gear rotates the crankshaft while cyclically causing a change in the angular velocity due to its profile. Since the second noncircular gear is positioned so that the change in the angular velocity caused by its rotation can cancel a change in torque of the crankshaft, the change in the torque of the engine are not transmitted to the starter motor, thereby operating the starter motor at constant current at all times, providing such additional advantages as smaller and lighter starter motor design and reduced noise.

4 Claims, 3 Drawing Sheets

ENGINE STARTER APPARATUS

BACKGROUND OF THE INVENTION

1. Field of the Invention

The invention relates to an engine starter apparatus, and more particularly to an improvement in an engine starter drive system from a crankshaft to a starter motor.

2. Related Art

A conventional engine starter apparatus is constructed as shown in FIG. 8. A ring gear 3 mounted on a crankshaft 2 of an engine 1 is engaged with a pinion 6 mounted on an output rotating shaft 5 of a starter motor 4 so that the ring gear 3 is rotated to start the engine 1.

It should be noted that the crankshaft of the engine is rotated by changes in the torque of the engine caused by the strokes such as intake, compression, power, and exhaust. This process similarly applies when the crankshaft is rotated to start the engine. That is, the crankshaft also undergoes the same changes in its rotational torque. As a result, a motor section of the starter motor, which imparts a rotational force to the crankshaft when the engine is to be started, is rotated acted upon by the changes in the torque. A current value flowing at the motor section of the starter motor which undergoes such changes in the torque changes in proportion to the torque as shown by the solid line shown in FIG. 6.

As shown in FIG. 7, the starter output characteristic (torque x rotational speed) of the starter motor generally depicts a heap as the current value increases with increasing load. A starter requirement is to be responsive to changes in the torque of the crankshaft, i.e., the current value shown in FIG. 6. In other words, a cranking speed which allows ignition must be ensured in the engine compression stroke (engine torque is at maximum). Thus, the motor section has heretofore been designed so that its operation range falls on a predetermined range (current values I'min to I'max) in the left side of the starter output curve shown in FIG. 7 which is close to the peak (maximum starter output). Accordingly, conventional engine starters, installed in passenger cars with torque changes that are comparatively large, are quite large and heavy.

In addition, in response to the changes in the torque of the engine, both the engine cranking speed and the starter cranking speed undergo changes, thereby causing abnormal sounds at various parts of the starter, ring gear, and the like.

The subject invention has been made to overcome the above conventional problems. Accordingly, an object of the invention is to provide an engine starter apparatus which is not only capable of using a small starter motor even for an engine with large changes in torque, but also free if noise from the gear ring and various parts of the starter.

SUMMARY OF THE INVENTION

An engine starter apparatus of the invention comprises a pair of noncircular gears, a pinion, and a starter motor. The pair of noncircular gears are interposed between a crankshaft and a ring gear in an engine starter drive system, and when the speed of rotation of one of the noncircular gears is kept constant, the other one is subjected to changes in angular velocity in correspondence with changes in torque caused at the crankshaft due to engine characteristics. The pinion is removably engageable with the ring gear and the starter motor outputs a drive force to start the engine upon turning on of a start switch.

According to the engine starter apparatus of the invention, when the starter motor outputs a drive force upon turning on the start switch, rotation of the motor is transmitted to the ring gear through the pinion, thereby rotating one of the noncircular gears at a constant speed. However, the other noncircular gear which comes to engage with that rotating noncircular gear rotates the crankshaft while cyclically causing a change in the angular velocity due to its profile. This other noncircular gear is positioned so that the change in angular velocity caused by its rotation can cancel a change in torque of the crankshaft. As a result, changes in the torque of the engine are not transmitted to the starter motor, thereby operating the starter motor at constant current at all times.

DETAILED DESCRIPTION OF THE PREFERRED EMBODIMENTS

Embodiments of the invention will now be described with reference to the accompanying drawings.

Figure 1:
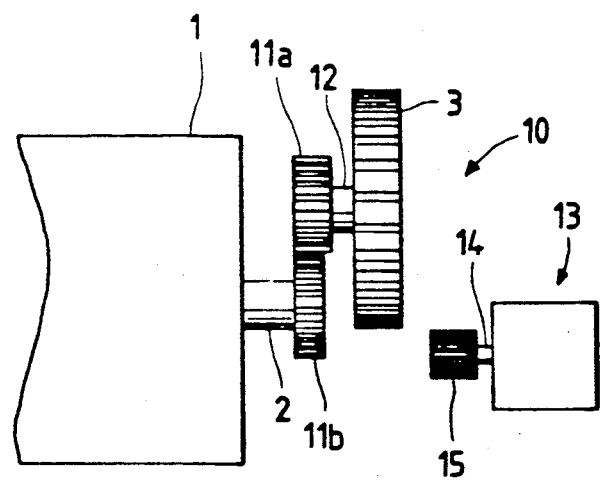
FIG. 1 is a diagram schematically showing the configuration of an engine starter apparatus, which is an embodiment of the invention.
Figure 2:
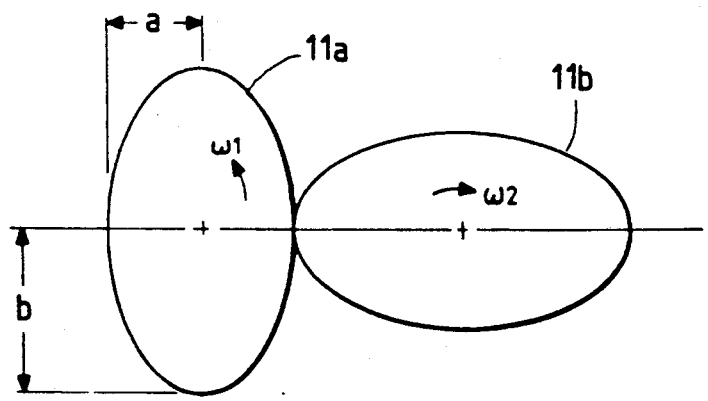
FIG. 2 is a front view showing a pair of oval gears, which are noncircular gears, used in the engine starting apparatus shown in FIG. 1.

FIG. 1 shows an engine starter apparatus 10 of the first embodiment of the invention. In the engine starter apparatus 10, an oval gear 11b is disposed on a crankshaft 2 of an engine 1, while an oval gear 11a, identical in shape, is disposed on a ring gear 3. Such a pair of oval gears 11a, 11b are engaged with each other so as to be able to transmit a rotating force as shown in FIG. 2. A starter motor 13 which outputs a drive force at the time the engine 1 is started is smaller in structure than a conventional starter for reasons to be described later. Reference numeral 14 designates an output rotating shaft; and reference numeral 15 a pinion disposed on the output rotating shaft 14.

The relationship between angular velocities $\omega_1$ and $\omega_2$ of such oval gears 11a, 11b can be expressed as follows with the shorter radius of each gear being 2a and its longer radius being 2b.

$$\omega_2 = \omega_1 \cdot \frac{r - 1 - (r^2 - 1)\cos 2\theta_1}{2r}$$

Figure 3:
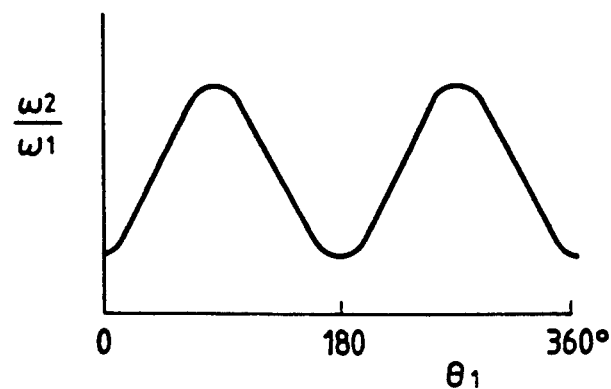
FIG. 3 is a diagram showing a variation in the ratio of angular velocity changes of the pair of oval gears shown in FIG. 2.

The ratio of their angular velocity changes ($\omega_2/\omega_1$) varies as shown in FIG. 3. In the above equation, $r = a/b$ and $\theta_1$ is the phase of the oval gear 11a. As is apparent from the above, assuming that rotation ($\omega_1$) of the gear 11a is constant, a change in angular velocity in the rotation of the other gear 11b takes place at a cycle of twice per rotation (360°). By the way, in a 4-cycle 1-cylinder engine, the compression stroke takes place once every two rotations (720°) of the crankshaft, while in a 4-cycle 4-cylinder engine, it takes place four times every two rotations (720°) of the crankshaft, i.e., twice every rotation, thereby synchronizing with the angular velocity change of the oval gear 11b.

Figure 6:
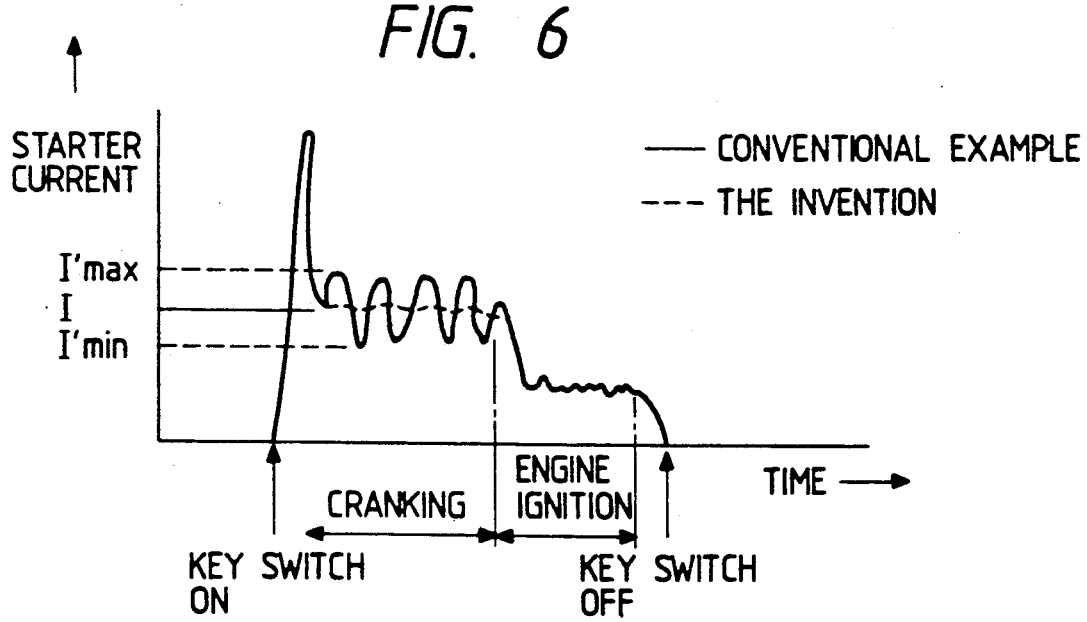
FIG. 6 is a diagram showing variations of starter current during operations of a starter motor in the engine starter apparatus of the invention and of a starter motor in a conventional engine starter apparatus.
Figure 7:
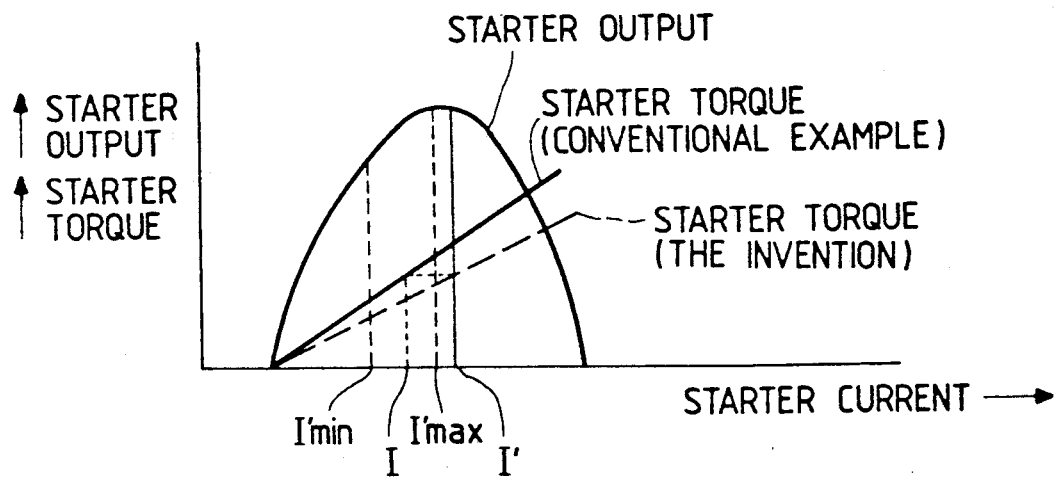
FIG. 7 is a characteristic diagram showing correlations between the starter current, starter output, and starter torque of a motor section of the starter motor.
Figure 8:
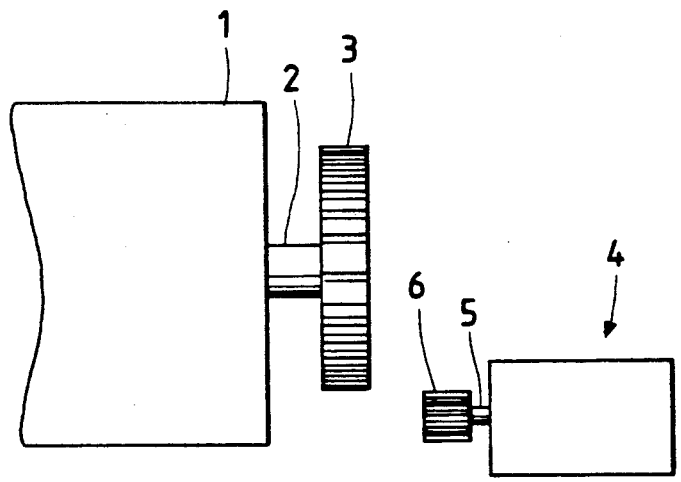
FIG. 8 is a diagram schematically showing the configuration of the conventional engine starter apparatus.

Therefore, if the oval gear 11b is disposed in alignment with the position of a piston of the engine 1 so that the oval gear 11b can obtain an angular velocity displacement corresponding to a change in the torque of the engine 1 and if the phase $\theta_1$ of the oval gear 11a is adjusted commensurate with such displacement, then the change in the torque of the engine received by the crankshaft 2 is cancelled by the angular velocity change. As a result, the change in the torque of the engine 1 is not transmitted to the motor section of the starter motor 13 while the starter motor 13 is operational, thus causing the motor section to be driven by a substantially constant current with a constant load as shown by the broken line shown in FIG. 6. If the motor section can be operated at such a substantially constant current, then, as is clear from the motor characteristic curves shown in FIG. 7, it is possible to design the motor section of the starter motor 13 to be a low-torque motor operated by a current I' at which the starter output reaches its peak. This allows a smaller and lighter starter motor 13 to be fabricated, and leads to a reduction in rotational speed variations of the ring gear 3 and various parts of the starter motor 13 with the advantage of lower noise.

Figure 4:
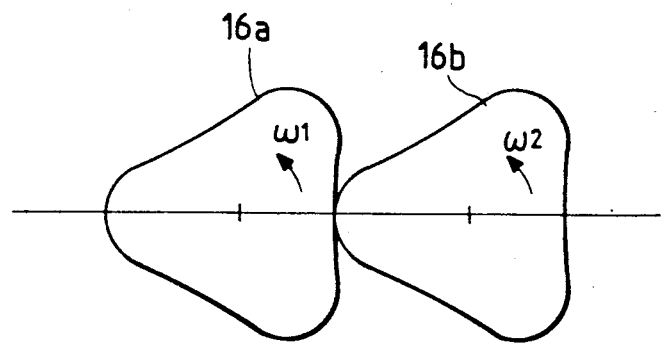
FIG. 4 is a front view showing a pair of triangular gears, which is another exemplary noncircular gears.
Figure 5:
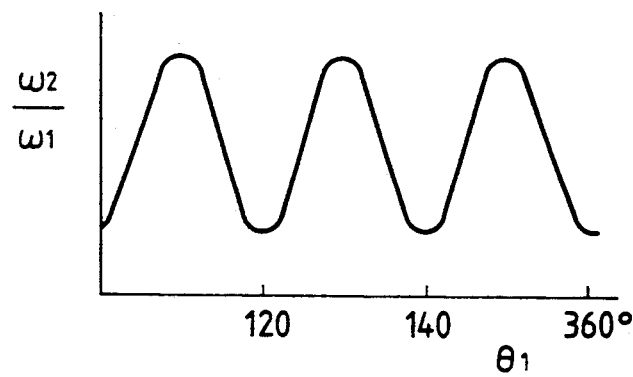
FIG. 5 is a diagram showing a variation of the angular velocity ratios of the pair of triangular gears shown in FIG. 4.

While the engine starter apparatus 10 in this embodiment uses a pair of oval gears 11a, 11b so that a 4-cycle 4-cylinder or 4-cycle 8-cylinder engine can be accommodated, a pair of triangular gears 16a, 16b shown in FIG. 4 may also be used to accommodate a 4-cycle 3-cylinder or 4-cycle 6-cylinder engine. In the latter case using the triangular gears 16a, 16b, a change in angular velocity due to rotation of the gear 16b takes place three times every rotation (360°), thus synchronizing with the torque variation cycle in the 4-cycle 3-cylinder or 4-cycle 6-cylinder engine.

As described in the foregoing pages, the engine starter apparatus of the invention is so constructed that a pair of noncircular gears are interposed between the crankshaft and the ring gear in the engine starter drive system and that the gears are positioned in correspondence with the piston so as to change their angular velocity in accordance with a change in torque caused at the crankshaft due to engine characteristics. As a result of such construction, not only the starter motor can be made smaller in structure and lighter in weight but also changes in the velocities of the ring gear and various part of the starter motor are reduced and their noise is likewise reduced.

What is claimed is:

1. An engine starter apparatus comprising:
   first and second noncircular gears operatively engaged with each other and interposed between a crankshaft and a ring gear in an engine starter drive system, said first noncircular gear being subjected to a change in angular velocity in relation to a change in torque caused at said crankshaft due to a characteristic of the engine, an angular velocity of said second noncircular gear being kept constant;
   a starter motor for imparting a torsional force to start said engine, said starter motor having a pinion which is removably engageable with said ring gear; and
   said first and second noncircular gears having a peripheral shape that is of a continuous curve.

2. An engine starter apparatus according to claim 1, in which said first and second noncircular gears is oval-shaped.

3. An engine starter apparatus according to claim 2, in which a relationship between angular velocities $\omega_1$ and $\omega_2$ of said noncircular oval gears can be expressed as follows with the shorter diameter of said noncircular gears being $2a$ and the longer diameter of each of said noncircular gears being $2b$:

$$\omega_2 = \omega_1 \times \frac{r + 1 + (r^2 - 1)\cos 2\theta_1}{2r}$$

4. An engine starter apparatus according to claim 1, in which each of said noncircular gears is triangular-shaped.

* * * * *